(12) United States Patent
Hwang et al.

(10) Patent No.: US 10,076,891 B2
(45) Date of Patent: Sep. 18, 2018

(54) BARRIER FILM AND METHOD FOR MANUFACTURING SAME

(71) Applicant: LG CHEM, LTD., Seoul (KR)

(72) Inventors: Jang Yeon Hwang, Daejeon (KR); Dong Ryul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 312 days.

(21) Appl. No.: 14/912,811

(22) PCT Filed: Apr. 30, 2015

(86) PCT No.: PCT/KR2015/004381
§ 371 (c)(1),
(2) Date: Feb. 18, 2016

(87) PCT Pub. No.: WO2015/167274
PCT Pub. Date: Nov. 5, 2015

(65) Prior Publication Data
US 2016/0200071 A1    Jul. 14, 2016

(30) Foreign Application Priority Data

Apr. 30, 2014  (KR) .......................... 10-2014-0052712

(51) Int. Cl.
*B32B 7/02* (2006.01)
*B32B 27/08* (2006.01)
(Continued)

(52) U.S. Cl.
CPC .............. *B32B 7/02* (2013.01); *B32B 27/08* (2013.01); *B32B 27/16* (2013.01); *B32B 27/325* (2013.01);
(Continued)

(58) Field of Classification Search
USPC ......................................................... 428/216
See application file for complete search history.

(56) References Cited

U.S. PATENT DOCUMENTS

2008/0226924 A1* 9/2008 Okubo ...................... B32B 7/02
                                                           428/426
2010/0019664 A1* 1/2010 Mishima ............. H01L 51/5268
                                                           313/504
(Continued)

FOREIGN PATENT DOCUMENTS

CN            1846988 A    10/2006
CN         101039801 A     9/2007
(Continued)

OTHER PUBLICATIONS

Machine_English_translation_KR_20130091281_A1; Ryu, Sang Uk; Gas Barrier Film and the Method for Preparing the Same; Aug. 16, 2013; EPO; whole document.*

*Primary Examiner* — Tahseen Khan
(74) *Attorney, Agent, or Firm* — Dentons US LLP

(57) ABSTRACT

The present application relates to a barrier film and a method of preparing the same, and provides a barrier film that can be applied to devices such as organic or inorganic light-emitting devices, display devices, and photovoltaic devices and thereby effectively insulate the internal electric components from chemical materials such as moisture and oxygen while maintaining excellent optical characteristics at the same time.

17 Claims, 1 Drawing Sheet

(51) Int. Cl.
*B32B 27/16* (2006.01)
*B32B 27/32* (2006.01)
*B32B 27/36* (2006.01)
*B32B 27/38* (2006.01)
*B32B 27/40* (2006.01)
*B32B 27/42* (2006.01)

(52) U.S. Cl.
CPC ............ *B32B 27/36* (2013.01); *B32B 27/365* (2013.01); *B32B 27/38* (2013.01); *B32B 27/40* (2013.01); *B32B 27/42* (2013.01); *B32B 2250/26* (2013.01); *B32B 2255/10* (2013.01); *B32B 2255/20* (2013.01); *B32B 2255/24* (2013.01); *B32B 2255/28* (2013.01); *B32B 2264/10* (2013.01); *B32B 2270/00* (2013.01); *B32B 2307/204* (2013.01); *B32B 2307/40* (2013.01); *B32B 2307/412* (2013.01); *B32B 2307/418* (2013.01); *B32B 2307/546* (2013.01); *B32B 2307/558* (2013.01); *B32B 2307/718* (2013.01); *B32B 2307/7244* (2013.01); *B32B 2307/7246* (2013.01); *B32B 2307/732* (2013.01); *B32B 2457/00* (2013.01); *B32B 2457/12* (2013.01); *B32B 2457/20* (2013.01)

(56) References Cited

U.S. PATENT DOCUMENTS

2010/0090201 A1\* 4/2010 Liu ..................... C08F 220/44
  257/40
2012/0064318 A1 3/2012 Keite-Telgenbüscher et al.
2014/0166105 A1\* 6/2014 Kawakami ............... B32B 7/02
  136/256

FOREIGN PATENT DOCUMENTS

| CN | 102380978 A | 3/2012 |
| CN | 102741047 A | 10/2012 |
| JP | 2007-076207 A | 3/2007 |
| JP | 2007-090803 A | 4/2007 |
| JP | 2010-208086 A | 9/2010 |
| JP | 2013-067109 A | 4/2013 |
| JP | 2013071258 A | 4/2013 |
| JP | 2013208844 A | 10/2013 |
| KR | 10-2012-0014175 A | 2/2012 |
| KR | 20130091281 A1 \* | 8/2013 |
| WO | 2013-047522 A1 | 4/2013 |
| WO | WO2013047522 A1 \* | 4/2013 |

\* cited by examiner

BARRIER FILM AND METHOD FOR MANUFACTURING SAME

This application is a National Stage Entry of International Application No. PCT/KR2015/004381, filed Apr. 30, 2015 and claims the benefit of and priority to Korean Application Nos. 10-2014-0052712, filed on Apr. 30, 2014, all of which are hereby incorporated by reference in their entirety for all purposes as if fully set forth herein.

TECHNICAL FIELD

The present application relates to a barrier film and a method for preparing the same.

BACKGROUND ART

Electric devices and metal wires that constitute the interior of devices such as organic or inorganic light-emitting device, display devices, and photovoltaic devices, when brought into contact with external chemical materials such as oxygen and moisture, tend to deteriorate or get oxidized, and become unable to perform their designated functions. Therefore, there is a need to protect the electric components from such chemical materials. To this end, the use of a glass plate as a substrate material or cover plate has been proposed as a means to insulate the chemical-sensitive internal devices. Glass plates have the advantages that they are adequate in terms of light transmittance, thermal expansion coefficient and chemical resistance. However, glass has the disadvantage that it is not only heavy but also brittle and fragile, requiring much caution in handling.

Accordingly, there are active attempts to replace glass plates with plastic, which is a material being lighter and having higher shock resistance and more flexibility than the glass plate currently in use for electronic devices. However, plastic films that are commercially manufactured at the present time have many disadvantages in terms of physical properties compared to the glass plates, requiring improvements therein. In particular, improvements are urgently needed in water resistance and a gas barrier property of plastic, and research has been actively conducted worldwide to develop a barrier film that uses a plastic film. Further, in view of possible applications that utilize light, such as in display or photovoltaic devices, a barrier film is required to possess not only an excellent gas barrier property but also excellent light transmittance. For a barrier film to be utilized in information-conveying display applications, not only is excellent light transmittance important, but its yellowness index is also important. If barrier films used in display manufacture have too high an absolute value of the yellowness index, distortion in the color aspect of optical data displayed on the device can be caused. Therefore, a barrier film having both an excellent gas barrier property and light transmittance is required.

PRIOR ART DOCUMENT

Patent Document

1. Japanese Unexamined Patent No. 2007-090803

DISCLOSURE

Technical Problem

The present application provides a barrier film, which can be applied to organic or inorganic light-emitting devices, display devices, and photovoltaic devices to effectively insulate the internal electrical components from chemical species such as moisture and oxygen while maintaining excellent optical characteristics at the same time, and a method of preparing the same.

Technical Solution

The present application relates to a barrier film. In one example, the barrier film of the present application may be applied to organic or inorganic light-emitting devices, display devices, and photovoltaic devices.

In one example, the barrier film of the present application may include a substrate layer, an inorganic layer, and a resin layer, sequentially. Also, the barrier film may include a first dielectric layer present between the substrate layer and the inorganic layer, or a second dielectric layer present between the inorganic layer and the resin layer. That is to say, the barrier film of the present application may include at least one of the first and second dielectric layers. Also, the barrier film may satisfy the following Expression 1 or Expression 2. From the above, in the absence of the first dielectric layer, the barrier film may satisfy Expression 2, and in the absence of the second dielectric layer, the barrier film may satisfy Expression 1. Also, as discussed in the following, if both of the first and second dielectric layers are present, the barrier film may satisfy at least one of Expression 1 and Expression 2.

As an example, a barrier film 10 as shown in FIG. 2 may have a substrate layer 14, a first dielectric layer 13, an inorganic layer 12, a second dielectric layer 11, and a resin layer 15, sequentially, and may satisfy Expression 1 or Expression 2.

$$n_p \leq n_s \leq n_1 < n_i \qquad \text{[Expression 1]}$$

$$n_p \leq n_s \leq n_2 < n_i \qquad \text{[Expression 2]}$$

In Expression 1 and Expression 2, $n_p$ is a refractive index of the resin layer, $n_s$ is a refractive index of the substrate layer, $n_1$ is a refractive index of the first dielectric layer, $n_2$ is a refractive index of the second dielectric layer, and $n_i$ is a refractive index of the inorganic layer.

In another embodiment of the present application, as shown in FIG. 1, the barrier film 10 includes the substrate layer 14, the inorganic layer 12, the second dielectric layer 11, and the resin layer 15, sequentially, and may satisfy the following Expression 2. In this case, the barrier film 10 may not include the first dielectric layer 13.

$$n_p \leq n_s \leq n_2 < n_i \qquad \text{[Expression 2]}$$

In Expression 2, $n_p$ is a refractive index of the resin layer, $n_s$ is a refractive index of the substrate layer, $n_2$ is a refractive index of the second dielectric layer, and $n_i$ is a refractive index of the inorganic layer. That is, from the previously-described structure of the barrier film 10, the first dielectric layer 13 may be omitted. In one example, when the substrate layer of a barrier film according to the present application is sufficiently even, the first dielectric layer which can serve a planarization purpose may be omitted. Therefore, the inorganic layer may be laminated directly on the smooth substrate layer.

From the above, the resin layer may be a layer of a structural adhesive or pressure-sensitive adhesive, but not limited thereto. Optical characteristics of a film having a structure of laminated multiple layers vary depending on the refractive indices and thicknesses of the constituent layers. In particular, since light reflection and refraction phenomena occur at the interface of two layers having different refractive indices, the material for the laminated layers and their lamination order thereof can adjust difference of the refractive indices at the interface, and therefore have a crucial influence on the optical characteristics of a multi-layer film. Also, the multi-layer film may include an additional resin layer having structural or pressure-sensitive adhesive characteristics that allow the film to be bonded to an electric device or optical device, however in this case, it is likely to cause changes in the optical characteristics by the addition. Therefore, in order to prevent degradation in the optical characteristics, the refractive index of the resin layer, thickness of each layer, or lamination order must be carefully controlled. As an example, in one of the embodiments, the first dielectric layer having a refractive index of 1.48 was formed to a thickness of 550 nm on a PC film (thickness 100 μm, refractive index 1.61) by using a coating solution formulated with pentaerythritol triacrylate and methylethoxy silane at a ratio of 40:60. On this coated film, a layer of ZnO was deposited as the inorganic layer to a thickness of 20 nm by sputtering. On this laminated layer, the second dielectric layer was formed to a thickness of 100 nm by using the coating solution having a refractive index of 1.48. A barrier film prepared as above showed light transmittance of 90.1% (arithmetical average in a wavelength range between 380 nm and 780 nm) according to an assessment made by Shimadzu UV3600, and a yellowness index of −0.1 according to ASTM E313, and could be implemented as a gas barrier film having excellent optical characteristics (In the CIE color scale, a*: −1.4, b*: 0.5). However, if a pressure-sensitive adhesive layer of 50 μm thick having a refractive index of 1.52 is laminated as the resin layer on the second dielectric layer of the above barrier film, optical characteristics are degraded, such that the light transmittance assessed by Shimadzu UV3600 decreases to 87.1% (arithmetical average between wavelengths of 380 nm and 780 nm) and the yellowness index according to ASTM E313 increases to 4.7 (In the CIE color scale, a*: −1.1, b*: 2.9). Therefore, in formation of a barrier film, it is necessary to control the refractive index and thickness of each layer, and layering order in the multi-layer structure by considering a resin layer as well.

The present application may include a substrate layer, an inorganic layer, a second dielectric layer, and a resin layer, sequentially, and satisfying Expression 2, or it may include a substrate layer, a first dielectric layer, an inorganic layer, a second dielectric layer, and a resin layer, sequentially, and satisfying Expression 1 or Expression 2. So long as the relationship of their refractive indices satisfy Expression 1 or Expression 2, material known to those of ordinary skill in the art can be used to form the substrate layer, the first dielectric layer, the inorganic layer, the second dielectric layer, and the resin layer without particular limitation and by satisfying the above relationship of the refractive indices, a barrier film having excellent optical characteristics and gas barrier property can be prepared.

The term, refractive index (indices), unless otherwise defined, is intended to mean a refractive index of any wavelength within or over the entire wavelength range between 300 nm and 1000 nm. In one example, it can mean a refractive index at a wavelength range of 550 nm or 633 nm.

Also, among material properties mentioned in the present specification, if a material property is temperature sensitive, the measurement thereof may be made at room temperature unless otherwise mentioned. The room temperature may be, for an example, one temperature point between 15° C. and 35° C. or 20° C. and 30° C., and for an example, it may be about 25° C. or about 20° C.

Also, in an embodiment of the present application, the refractive index of the first dielectric layer $n_1$ or the refractive index of the second dielectric layer $n_2$ is not particularly limited so long as they satisfy Expression 1 or Expression 2. For example, the refractive index of the first dielectric layer $n_1$ and the refractive index of the second dielectric layer $n_2$ may be in the range of 1.35 to 1.9, 1.4 to 1.9, 1.45 to 1.9 or 1.45 to 1.8. In one example, when both the first and second dielectric layers are present, the refractive index of the first dielectric layer $n_1$ may be bigger than, smaller than, or equal to the refractive index of the second dielectric layer $n_2$. Also, the refractive index of the first dielectric layer $n_1$ or the refractive index of the second dielectric layer $n_2$ may be bigger than or equal to the refractive index of the substrate layer $n_s$. However, the refractive index of the first dielectric layer $n_1$ or the refractive index of the second dielectric layer $n_2$ may be smaller than the refractive index of the substrate layer $n_s$, so long as Expression 1 or Expression 2 is satisfied, the refractive index of the first dielectric layer $n_1$ and the refractive index of the second dielectric layer $n_2$ cannot both be smaller than the refractive index of the substrate layer $n_s$ at the same time. As such, by controlling the refractive index of the first dielectric layer $n_1$, the refractive index of the second dielectric layer $n_2$, and the refractive index of the substrate layer $n_s$, excellent optical characteristics and gas barrier property can be maintained even when a resin layer is incorporated.

In one example, a barrier film of the present application may satisfy both Expression 1 and Expression 2. In this case, both the refractive index of the first dielectric layer $n_1$ and the refractive index of the second dielectric layer $n_2$ can be bigger than or equal to the refractive index of the substrate layer $n_s$ at the same time. In one embodiment where the refractive index of the first dielectric layer $n_1$ is equal to the refractive index of the substrate layer $n_s$, since the first dielectric layer does not make any optical contribution to the barrier film, it may correspond to the case in which the first dielectric layer is absent in the present application. For example, when surface planarization is required because the surface roughness is several tens of nanometers or more, or there is a need to alter the surface characteristics (such as surface energy, chemical resistance, scratch resistance) of the substrate layer for reasons pertaining to the manufacturing processes of a barrier film, a first dielectric layer having the same refractive index as the substrate layer may be used. For the above reason, when evenness of the substrate layer and other surface characteristics do not adversely affect the characteristics of the barrier film or the manufacturing processes thereof, it may be possible to form the inorganic layer directly on the substrate layer, without a formation of an additional first dielectric layer.

The relationship of the refractive indices of the first and second dielectric layers of the barrier film according to the present application can be appropriately controlled depending on the characteristics of the material of each of the layers, relationship of their refractive indices, characteristics of the inorganic layer, or thickness of each dielectric layer of the barrier film.

In one example, when $n_1$ is equal to or bigger than $n_2(n_1 \geq n_2)$, $d_1$ may be equal to or less than $d_2(d_1 \leq d_2)$, and when $n_2$ is equal to or bigger than $n_1(n_2 \geq n_1)$, $d_2$ may be equal to or less than $d_1(d_2 \leq d_1)$. That is, in terms of the relationship between the first dielectric layer and the second dielectric layer, the thickness of the high refractive index layer may not be more than that of the low refractive index layer. More particularly, when the refractive index of the first dielectric layer is higher than that of the second dielectric layer, the thickness of the first dielectric layer may be smaller than or equal to that of the second dielectric layer, and when the refractive index of the second dielectric layer is more than that of the first dielectric layer, the thickness of the second dielectric layer may be smaller than or equal to that of the first dielectric layer. When the refractive indices of the first and second dielectric layers are identical to each other, their thickness relationship is not particularly limited. The present application, as described above, may provide a barrier film having excellent optical characteristics and gas barrier property by adjusting the relationship between the thicknesses of the dielectric layers in accordance with their refractive indices.

In one example, the first dielectric layer or the second dielectric layer may have a thickness in the range of 10 nm to 1 μm, 10 nm to 900 nm, 20 nm to 800 nm, 30 nm to 700 nm, 35 nm to 600 nm, 40 nm to 500 nm, or 45 nm to 400 nm. In an embodiment of the present application, when $n_1$ is bigger than $n_2$, the thickness of the first dielectric layer may be less than 450 nm, and when $n_2$ is bigger than $n_1$, the thickness of the second dielectric layer may be less than 450 nm. In both cases, the thickness of the first dielectric layer or the thickness of the second dielectric layer, specifically, may be less than 400 nm or less than 350 nm. In one embodiment, in both cases, the thickness of the first or second dielectric layer may be in the range of 30 nm to 430 nm, for example, in the range of 40 nm to 400 nm, 55 nm to 380 nm, 95 nm to 350 nm, or 100 nm to 330 nm.

More particularly, in the present application, as long as the barrier film satisfies Expression 1 and Expression 2, when $n_1$ is bigger than or equal to $n_2$, the first dielectric layer may have a thickness equal to or more than 100 nm and less than 450 nm, and when $n_2$ is bigger than or equal to $n_1$, the second dielectric layer may have a thickness equal to or more than 100 nm and less than 450 nm.

Also, in an embodiment of the present application, the relationships among the refractive index of the first dielectric layer $n_1$, the refractive index of the second dielectric layer $n_2$, and the refractive index of the inorganic layer $n_i$ are not particularly limited so long as they satisfy Expression 1 or Expression 2. For example, the refractive index of the first dielectric layer $n_1$ may be smaller than the refractive index of the inorganic layer $n_i$. Also, the refractive index of the second dielectric layer $n_2$ may be smaller than the refractive index of the inorganic layer $n_1$.

In the embodiment of the present application, the refractive index of the first dielectric layer $n_1$ and the refractive index of the inorganic layer $n_i$ may satisfy the following Expression 3.

$$0.3 \le (n_1-1)/(n_i-1) \le 0.95 \quad \text{[Expression 3]}$$

As shown in Expression 3, the ratio of the refractive index of the first dielectric layer $n_1$ to the refractive index of the inorganic layer $n_i$, $(n_1-1)/(n_i-1)$ may range from 0.3 to 0.95, preferably from 0.3 to 0.85, from 0.4 to 0.8, from 0.45 to 0.75, or from 0.45 to 0.7. As such, by limiting the ratio of the refractive indices of the inorganic layer and first dielectric layer, it is possible to prepare a film with excellent light transmittance.

Also, in the embodiment of the present invention, the refractive index of the second dielectric layer $n_2$ and the refractive index of the inorganic layer $n_i$ may satisfy the following Expression 6.

$$0.3 \le (n_2-1)/(n_i-1) \le 0.95 \quad \text{[Expression 6]}$$

As shown in Expression 6, the ratio of the refractive index of the second dielectric layer $n_2$ to the refractive index of the inorganic layer $n_i$, $(n_2-1)/(n_i-1)$ may range from 0.3 to 0.95, preferably from 0.3 to 0.85, from 0.4 to 0.8, from 0.45 to 0.75, or from 0.45 to 0.7. As such, by limiting the ratio of the refractive index of the inorganic layer to that of the second dielectric layer to a particular range, a film having an excellent light transmittance can be prepared.

In the embodiment of the present application, the refractive index of the resin layer, $n_p$ may be equal to or smaller than the refractive index of the substrate layer $n_s$. Also, the refractive index of the resin layer $n_p$ may be smaller than the refractive index of the first dielectric layer $n_1$ or the refractive index of the second dielectric layer $n_2$. Also, the refractive index of the resin layer $n_p$ may be smaller than the refractive index of the inorganic layer $n_i$. As such, even when the barrier film includes a resin layer, by controlling the refractive index of the resin layer $n_p$ it is possible to maintain excellent optical characteristics and gas barrier property. In one example, the refractive index of the resin layer may be in the range from 1.4 to 1.7, from 1.35 to 1.65, from 1.4 to 1.6, from 1.45 to 1.6, from 1.45 to 1.6, or from 1.45 to 1.55.

Also, in the embodiment of the present application, there is no particular limitation in the refractive index of the substrate layer and it may range from 1.45 to 1.78, from 1.45 to 1.75, or from 1.45 to 1.7. The refractive index of the inorganic layer may be at least 1.65 or more, for example, 1.7 or more, 1.75 or more, 1.8 or more, 1.85 or more, 1.9 or more, 1.95 or more, 1.96 or more, 1.97 or more, 1.98 or more, 1.99 or more, or 2.0 or more. Although there is no particular upper limit determined for the refractive index of the inorganic layer, for example, it may be 3.0 or less, 2.5 or less, 2.4 or less, 2.3 or less or, 2.2 or less. The present application may provide a barrier film having excellent optical characteristics and a gas barrier property by controlling the refractive indices of the relatively high refractive inorganic layer, the first and second dielectric layers, and the resin layer.

On the other hand, the thickness of the first dielectric layer $d_1$ may be around 100 nm, and its relationship with the thickness of the second dielectric layer may vary as shown in Expression 4 and Expression 5. For example, when the thickness of the first dielectric layer is 100 nm or more, the second dielectric layer may have the thickness equal to or less than that of the first dielectric layer. Also, when the thickness of the first dielectric layer $d_1$ is less than 100 nm, the thickness of the second dielectric layer may be equal to or more than that of the first dielectric layer.

In one example when thickness of the first dielectric layer is 100 nm or more, the barrier film may satisfy the following Expression 4.

$$0.01 \le d_2/d_1 \le 1 \quad \text{[Expression 4]}$$

In Expression 4, $d_1$ is a thickness of the first dielectric layer and $d_2$ is a thickness of the second dielectric layer. As shown above, the ratio of the thickness of the second dielectric layer $d_2$ to the thickness of the first dielectric layer $d_1$ may range from 0.01 to 1, or equal to and more than 0.01 and less than 1, and for example, it may range from 0.02 to 1.0, from 0.05 to 1.0, from 0.1 to 1.0, from 0.1 to 0.9, from 0.1 to 0.8, or from 0.1 to 0.7. As such, by limiting the ratio of the thickness of the first dielectric layer to the thickness of the second dielectric layer to a particular range, a film having not only an excellent gas barrier property but also excellent light transmittance can be prepared.

In another example of the present application, when the thickness of the first dielectric layer is less than 100 nm, the barrier film may satisfy the following Expression 5.

$$0.01 \leq d_1/d_2 \leq 1 \quad \text{[Expression 5]}$$

In Expression 5, $d_1$ is a thickness of the first dielectric layer and $d_2$ is a thickness of the second dielectric layer. As shown in the above, the ratio of the thickness of the first dielectric layer $d_1$ to the thickness of the second dielectric layer $d_2$ may range from 0.01 to 1, or equal to or more than 0.01 and less than 1, and for example, it may range from 0.02 to 1.0, from 0.05 to 1.0, from 0.1 to 1.0, from 0.1 to 0.9, from 0.1 to 0.8 or, from 0.1 to 0.7. As such, by limiting the ratio of the thickness of the first dielectric layer to the thickness of the second dielectric layer to a particular range, a film having not only an excellent gas barrier property but also excellent light transmittance can be prepared.

In the barrier film according to the present application, the relationship between the thickness of the first dielectric layer and the thickness of the second dielectric layer can be suitably controlled depending on the characteristics of materials constituting each of the layers in the barrier film, the relationship of their refractive indices, the characteristics of the inorganic layer, or the thickness of the first dielectric layer, and as described above, the barrier film may satisfy Expression 4 or Expression 5. For example, by satisfying the above thickness relationship and incorporating a high refractive index inorganic layer, an excellent gas barrier property and light transmittance can be achieved.

The barrier film may have an excellent light transmittance in the visible light region. In one example, the barrier film according to the present application may have light transmittance of 88% or more at any wavelength within or over the entire wavelength range of 380 nm to 780 nm. In the present application, a barrier film including the substrate layer, the first dielectric layer, the inorganic layer, and the second dielectric layer, sequentially, can maintain excellent transparency. For example, a barrier film whose constituent layers satisfy the above-mentioned relationships in their refractive indices or in their thickness ratios may have light transmittance of 88% or more, 88.3% or more, 88.7% or more, 88.9% or more, or 89% or more, at any wavelength within or over the entire wavelength range of 380 nm to 780 nm.

Also, the barrier film may simultaneously exhibit excellent light transmittance and a low yellowness index. In one example where the constituent layers satisfy the above-mentioned relationships in their refractive indices or in their thickness ratios, a barrier film having a low yellowness index can be provided. For example, a yellowness index according to ASTM E313 may range from −2.5 to 2.5, from −2.0 to 2.4, from −1.5 to 2.3, from −1.0 to 2.2, from −0.9 to 2.0, from −0.5 to 1.5 or from −0.5 to 1.3.

In the embodiment of the present application, any material known to those of ordinary skill in the art may be used without particular limitation to prepare the substrate layer, the first dielectric layer, the inorganic layer, the second dielectric layer, and the resin layer, so long as the above-mentioned relationships in their refractive indices or thicknesses are satisfied.

In one example, the substrate layer may include one or more resin selected from the group consisting of polyester-based resins such as a polyethylene terephthalate, a polycarbonate, a polyethylene naphthalate and a polyarylate; polyether-based resins such as a polyethersulfone; polyolefin-based resins such as a cyclo-olefin polymer, a polyethylene resin and a polypropylene resin; cellulose-based resins such as a diacetyl cellulose, a triacetyl cellulose, an acetate butyrate cellulose; polyimide-based resins; and epoxy-based resins. In the present application, the substrate layer may preferably include polyethylene terephthalate, polycarbonate, or cyclo-olefin polymer. Also, the substrate layer may have a coating layer laminated on the opposite side to the multi-layer structure. The coating layer may be laminated to a thickness of 0.01 µm to 10 µm, and by including such a coating layer the barrier film may be given the capability to improve optical characteristics, complement mechanical properties, or facilitate further process operations. In one example where the thickness of the substrate layer is not particularly limited it may range from 2 µm to 200 µm, from 5 µm to 190 µm, from 10 µm to 180 µm, from 20 µm to 180 µm, or from 20 µm to 150 µm.

In one example, a material used to form the inorganic layer is not particularly limited so long as the previously mentioned refractive index is satisfied. For example, the inorganic layer may include at least one metal oxide or metal nitride, selected from the group consisting of Al, Zr, Ti, Hf, Ta, In, Sn, Zn, Ce, and Si. The thickness of the inorganic layer, as previously described, may range from 5 nm to 50 nm, from 7 nm to 48 nm, from 10 nm to 45 nm, from 12 nm to 43 nm, from 15 nm to 40 nm, or from 17 nm to 45 nm. In one example, the inorganic layer of the present application may be zinc-oxide based. A zinc-oxide material may be zinc-oxide without dopant, or a dopant-comprising zinc-oxide material. Dopants that can be used with zinc-oxide may be at least one element, or an oxide thereof, selected from the group consisting of Ga, Si, Ge, Al, Sn, Ge, B, In, Tl, Sc, V, Cr, Mn, Fe, Co, and Ni, but is not limited thereto. The dopant can be doped in zinc oxide (ZnO) in a cationic form, and by substituting zinc, the dopant can function to increase the concentration of electrons or holes in the zinc-oxide based inorganic layer. However, in order not to impede electron mobility, the dopant concentration is preferably in the range of 0.1 to 20 at %. For a barrier film, its gas barrier property, mechanical, and optical characteristics are more important than its electrical characteristics. In the case where the mechanical and optical characteristics are to be modified by using a dopant, the dopant can be used at a concentration of 15 at % to as high as 85 at %. In the embodiment of the present application, the inorganic layer may be composed of, for example, zinc-tin oxide.

In the embodiment of the present application, the first dielectric layer or second dielectric layer may be an organic or organic-inorganic composite layer. In one example, the first dielectric layer or second dielectric layer may include at least one compound selected from the group consisting of an acryl-based resin, a urethane-based resin, a melamine resin, an alkyd resin, an epoxy-based resin, a siloxane-based polymer, and an organic silane compound represented by Formula 1.

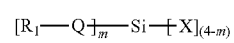

[Formula 1]

In Formula 1, X is hydrogen, a halogen, an alkoxy group, an acyloxy group, an alkyl carbonyl group, an alkoxy carbonyl group, or $-N(R_2)_2$, where $R_2$ is hydrogen or an alkyl group, $R_1$ is an alkyl group, an alkenyl group, an alkynyl group, an aryl group, an arylalkyl group, an alkylaryl group, an arylalkenyl group, an alkenylaryl group, an arylalkinyl group, an alkynylaryl group, a halogen, an amino group, an amide group, an aldehyde group, an alkylcarbonyl group, a carboxy group, a mercapto group, a cyano group, a hydroxy group, an alkoxy group, an alkoxycarbonyl group, a sulfonyl group, a phosphoryl group, an acryloyloxy group, a methacryloxy group, or an epoxy group, and Q is a single bond, an oxygen atom, or —N(R$_2$)—, where R$_2$ is a hydrogen atom or an alkyl group, and m is a number in the range of 1 to 3.

The organic silane may be one or more compound selected from the group consisting of compounds represented by Formula 1, and when more than one organic silane compound is used, crosslinking may be possible.

Examples of the organic silane compounds include methyltrimethoxysilane, methyltriethoxysilane, phenyltrimethoxysilane, phenyltriethoxysilane, dimethyldimethoxysilane, dimethyldiethoxysilane, diphenyldimethoxysilane, diphenyldiethoxysilane, phenyldimethoxysilane, phenyldiethoxysilane, methyldimethoxysilane, methyldiethoxysilane, phenylmethyldimethoxysilane, phenylmethyldiethoxysilane, trimethylmethoxysilane, trimethylethoxysilane, triphenylmethoxysilane, triphenylethoxysilane, phenyldimethylmethoxysilane, phenyldimethylethoxysilane, diphenylmethylmethoxysilane, diphenylmethylethoxysilane, dimethylmethoxysilane, dimethylethoxysilane, diphenylmethoxysilane, diphenylethoxysilane, 3-aminopropyltriethoxysilane, 3-glycidoxypropyltrimethoxysilane, p-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropylmethyltrimethoxysilane, n-phenylaminopropyltrimethoxysilane, vinylmethyldiethoxysilane, vinyltriethoxysilane, and vinyltrimethoxysilane, or a combination thereof.

In one example, the first dielectric layer or second dielectric layer may include one or more compound selected from the group consisting of pentaerythritol triacrylate, hydroxyethylacrylate, hydroxyethylacrylate, polyethyleneglycol monoacrylate, ethyleneglycol monoacrylate, hydroxybutylacrylate, glyxidoxymethacrylate, propyleneglycol monoacrylate, trimethoxysilylethyl epoxycyclohexane, acrylic acid, and methacrylic acid.

In one example, the epoxy-based resin may be one or more resin selected from the group consisting of an alicyclic epoxy resin and an aromatic epoxy resin.

The alicyclic epoxy resin may be one or more alicyclic epoxy resin selected from the group consisting of an alicyclic glycidyl-ether type epoxy resin and an alicyclic glycidyl-ester type epoxy resin. Also, it is possible to use, for example, Celloxide 2021P (Daicel Co.) which is 3,4-epoxycyclohexyl-methyl-3,4-epoxycyclohexane carboxylate, and derivatives thereof, since they are stable at high temperatures, colorless, transparent, and excellent in toughness, adhesion and lamination adhesive strength. Particularly, they have an excellent surface hardness when used as coating.

The aromatic epoxy resin may be one or more aromatic epoxy resin selected from the group consisting of a bisphenol A-type epoxy resin, a brominated bisphenol A-type epoxy resin, a bisphenol F-type epoxy resin, a bisphenol AD-type epoxy resin, a fluorene-comprising epoxy resin, and a triglycidyl isocyanurate.

An inorganic compound used to form the first dielectric layer or second dielectric layer may be a coating composition formed by a sol-gel process, or for example, one or more compound selected from the group consisting of SiO$_x$ (x is an integer from 1 to 4), SiO$_x$N$_y$ (x and y are integers from 1 to 3), Al$_2$O$_3$, TiO$_2$, ZrO, and ITO.

For example, a coating composition formed by the sol-gel process may be mixed with the previously-mentioned epoxy resin, and mixing the previously mentioned TiO$_2$ or ZrO with the epoxy resin can increase the refractive index by 1.6 or more.

Also, the first dielectric layer or second dielectric layer may further include one or more compound selected from the group consisting of metal alkoxide compounds represented by the following Formula 2.

[Formula 2]

In Formula 2, M is a metal selected from the group consisting of aluminum, zirconium, and titanium, and R$_3$ is a halogen, an alkyl group, an alkoxy group, an acyloxy group, or a hydroxy group, and z is 3 or 4.

In the embodiment of the present application, the first dielectric layer or second dielectric layer may further comprise nanoparticle fillers, in order to adjust the refractive index. The filler may be a metal oxide or a metal nitride, but is not limited thereto. In one example, the filler may include at least one compound selected from the group consisting of CaO, CaF$_2$, MgO, ZrO$_2$, TiO$_2$, SiO$_2$, In$_2$O$_3$, SnO$_2$, CeO$_2$, BaO, Ga$_2$O$_3$, ZnO, Sb$_2$O$_3$, NiO, and Al$_2$O$_3$. Also, in one example where the filler is incorporated in a dielectric layer, adhesive strength can be improved by treating the surface of the filler, as needed. For example, the surface treatment may be carried out using epoxy silane, acrylic silane, or vinyl silane. The filler may have a particle diameter in the range of 0.1 nm to 150 nm, 0.1 nm to 100 nm, 1 nm to 90 nm, 1 nm to 70 nm, or 1 nm to 50 nm. By limiting the particle diameter of the filler to the ranges listed above, not only can transparency of the film be achieved, but also the refractive index desired in the present application can be achieved.

The first dielectric layer or second dielectric layer may be cured by heat-curing, photo-curing, or a combination thereof, and may include a thermal acid generator or a photo acid generator, if needed.

If curing is to be carried out using heat, thermal resistance of the substrate layer should be considered, and when the substrate layer is amorphous, a temperature below the glass transition temperature must be used, whereas a substrate layer having crystalline properties can be cured at a temperature above the glass transition temperature. For example, a preferable temperature range of curing for cyclo olefin copolymer (COP) is 120° C. or below, for polycarbonate (PC) 130° C. or below, for poly(ethylene terephthalate) (PET) 130° C. or below, and for polyethylenenaphthalate (PEN) it is 150° C. or below.

In the embodiment of the present application, as long as the previously stated Expression 1 or Expression 2 is satisfied, the resin layer may be composed of materials well-known in the art. For example, the resin layer may have an adhesive material or pressure-sensitive adhesive material. In the present specification, the term "pressure-sensitive adhesive material" or "pressure-sensitive adhesive composition(s)" refers to a material that retains viscosity at room temperature, and can form a bond when pressure is applied without activation by heat, water, or solvent, shows a strong bonding strength once the bond is formed, and possesses cohesiveness and elasticity. In the present specification, the term "adhesive material" or "adhesive composition(s)" refers to a material that provides a permanent bond, unlike a pressure-sensitive adhesive material that provides a temporary bond, and is intended to mean a composition that is often applied in liquid form in which its adhesive ability is realized as the substance hardens, freezes, or cures, and once the bond is formed, separating the adhered objects may cause physical destruction of the adhered objects. That is, if the resin layer comprises a pressure-sensitive adhesive composition, a pressure-sensitive adhesive layer can be realized whereas the resin layer comprising an adhesive composition, an adhesive layer can be realized. The resin layer may comprise, for example, styrene-based resin, polyolefin-based resin, thermoplastic elastomer, polyoxyalkylene-based resin, polyester-based resin, polyvinyl chloride-based resin, polycarbonate-based resin, polyphenylene sulfide-based resin, hydrocarbon compound, polyamide-based resin, acryl-based resin, epoxy-based resin, silicone-based resin, fluoro-based resin, or a mixture thereof. Also, the resin listed above, for example, may have one or more heat-curable functional group such as a glycidyl group, a isocianate group, a hydroxy group, a carboxyl group, and an amide group, or the resin may have one or more functional group or part that is curable by irradiation of active energy beams, such as an epoxide group, a cyclic ether group, a sulfide group, an acetal group, and a lactone group.

The present application also relates to a method of preparing the barrier film described above.

In one example, a method of preparing the barrier film includes forming an inorganic layer and a resin layer on a substrate layer, wherein the method may further include forming a first dielectric layer between the substrate layer and the inorganic layer, or forming a second dielectric layer between the inorganic layer and the resin layer. The barrier film, as described above, may satisfy Expression 1 or Expression 2.

Also, in one example, a method of preparing the barrier film may include laminating the first dielectric layer, the inorganic layer, the second dielectric layer, and the resin layer on the substrate layer. The barrier film may satisfy the following Expression 1 or Expression 2.

$$n_p \leq n_s \leq n_1 < n_i \quad \text{[Expression 1]}$$

$$n_p \leq n_s \leq n_2 < n_i \quad \text{[Expression 2]}$$

In Expression 1 and Expression 2, $n_p$ is a refractive index of the resin layer, $n_s$ is a refractive index of the substrate layer, $n_1$ is a refractive index of the first dielectric layer, $n_2$ is a refractive index of the second dielectric layer, and $n_i$ is a refractive index of the inorganic layer.

The first dielectric, inorganic, and second dielectric layers can be formed, sequentially, on the substrate layer by a method such as vacuum evaporation, sputtering, atomic layer deposition, ion plating, or a coating method, but is not limited thereto, and any general method that is known in the art may be employed.

Advantageous Effect

A barrier film according to the present application can be applied to organic or inorganic light-emitting devices, display devices, and photovoltaic devices and thereby effectively insulate the internal electric components from chemical materials such as moisture and oxygen while maintaining excellent optical characteristics at the same time.

REFERENCE SIGNS LIST

Figure 1:
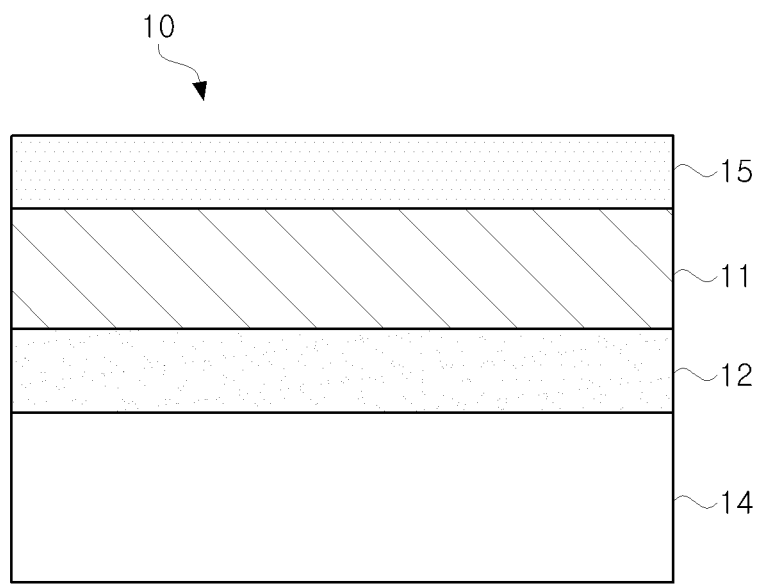
FIGS. 1 and 2 illustrate an exemplary barrier film according to the present application.
Figure 2:
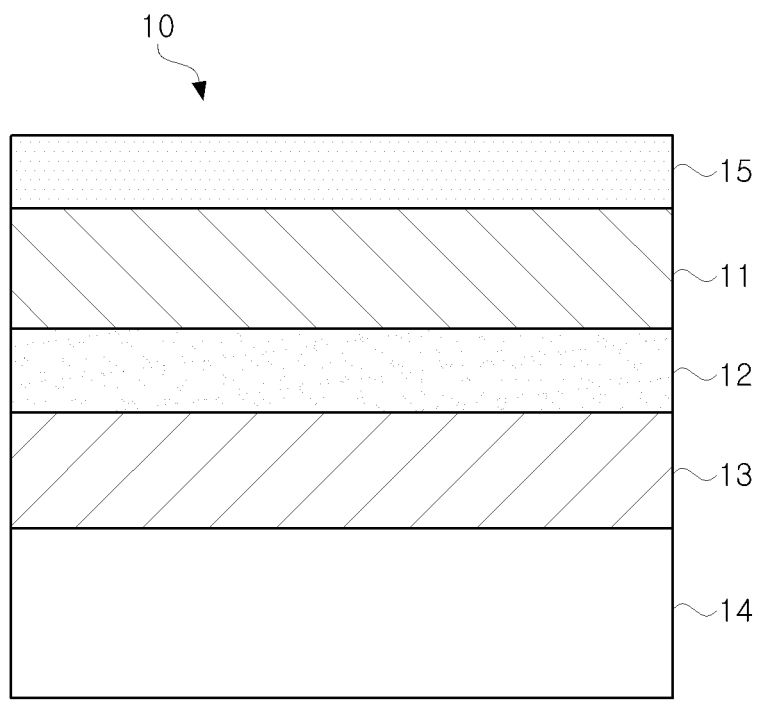

10: Barrier film
11: Second dielectric layer
12: Inorganic layer
13: First dielectric layer
14: Substrate layer
15: Resin layer

MODES OF THE INVENTION

Hereinafter, the present application will be discussed in further detail with reference to examples in accordance with the present application and comparative examples not in accordance with the present application, however the examples set forth herein should not be interpreted as limiting the scope of the present application.

Example 1

On a COP film (thickness 50 µm, refractive index 1.53) as a substrate layer, a coating solution comprising acrylic resin and metal oxide nanoparticles (TYT60, Toyoink Co.) was used to form a first dielectric layer having a refractive index of 1.60 to a thickness of 220 nm. On the coated film, zinc-tin oxide was laminated by sputtering as an inorganic layer having a thickness of about 19 nm and a refractive index of 2.0. On this laminated layer, by using the same coating solution, a second dielectric layer was formed to a thickness of 220 nm and, on this second dielectric layer, a resin layer having a refractive index of 1.52 and a thickness of 50 µm (LBPSA-LX150, LG Chemical Inc.) was laminated, to produce a barrier film.

Example 2

A barrier film was prepared by the method described in Example 1 except that a first dielectric layer and a second dielectric layer were prepared to have a thickness of 90 nm.

Comparative Example 1

A barrier film was prepared by the method described in Example 1 except that the dielectric layers (the first and second dielectric layers) having a refractive index of 1.48 were formed using a coating solution formulated with pentaerythritol triacrylate and methylethoxy

Comparative Example 2

A barrier film was prepared by the method described in Example 2 except that the dielectric layers (the first and second dielectric layers) having a refractive index of 1.48 were prepared by using a coating solution formulated with pentaerythritol triacrylate and methylethoxy silane at a ratio of 40:60.

Example 3

On a COP film (thickness 50 µm, refractive index 1.53) as a substrate layer, a first dielectric layer having a refractive index of 1.65 was formed to a thickness of 220 nm by using a coating solution comprising acrylic resin and metal oxide nanoparticles (TYT65, Toyoink Co.). On the coated film, zinc-tin oxide was laminated by sputtering as an inorganic layer having a thickness of about 19 nm and a refractive index of 2.0. On this laminated layer, a second dielectric layer was formed to a thickness of 220 nm and having a refractive index of 1.48 by heat-curing a coating solution formulated with pentaerythritol triacrylate and methylethoxy silane at a ratio of 40:60, and on the second dielectric layer, a resin layer having a refractive index of 1.52 and a thickness of 50 μm (LBPSA-LX150, Lg Chemical) was laminated, to produce a barrier film.

Example 4

A barrier film was prepared by the method described in Example 3 except that a first dielectric layer having a refractive index of 1.48 was formed by heat-curing a coating solution formulated with pentaerythritol triacrylate and methylethoxy silane at a ratio of 40:60, and a second dielectric layer having a refractive index of 1.65 was formed by using a coating solution comprising acrylic resin and metal oxide nanoparticles (TYT65, Toyoink Co.).

Comparative Example 3

A barrier film was prepared by the method described in Example 4 except that a resin layer was not formed.

Example 5

On a COP film (thickness 50 μm, refractive index 1.53) as a substrate layer film, a first dielectric layer having a refractive index of 1.65 was formed to a thickness of 90 nm by using a coating solution comprising acrylic resin and metal oxide nanoparticles (TYT65, Toyoink Co.). On the coated film, zinc-tin oxide was laminated by sputtering as an inorganic layer having a thickness of about 19 nm and a refractive index of 2.0. On this laminated layer, a second dielectric layer was formed to a thickness of 350 nm and having a refractive index of 1.48 by using a coating solution formulated with pentaerythritol triacrylate and methylethoxy silane at a ratio of 40:60, and on the second dielectric layer, a resin layer having a refractive index of 1.52 and a thickness of 50 μm (LBPSA-LX150, LG Chemical Inc.) was laminated, to produce a barrier film.

Example 6

A barrier film was prepared by the method described in Example 5 except that the first dielectric layer was prepared to have a thickness of 70 nm.

Example 7

A barrier film was prepared by the method described in Example 5 except that the first dielectric layer was prepared to have a thickness of 350 nm.

Example 8

A barrier film was prepared by the method described in Example 5 except that the first dielectric layer was prepared to have a thickness of 350 nm and the second dielectric layer was prepared to have a thickness of 500 nm.

Example 9

A barrier film was prepared by the method described in Example 5 except that the first dielectric layer was prepared to have a thickness of 50 nm.

Comparative Example 4

A barrier film was prepared by the method described in Example 5 except that the first dielectric layer was prepared to have a thickness of 450 nm.

Comparative Example 5

A barrier film was prepared by the method described in Example 5 except that the first dielectric layer was prepared to have a thickness of 350 nm and the second dielectric layer was prepared to have a thickness of 90 nm.

Comparative Example 6

A barrier film was prepared by the method described in Example 5 except that the first dielectric layer was prepared to have a thickness of 500 nm.

1. Measurement of Refractive Index and Thickness

Refractive index and thickness of each of the layers prepared in the Examples and the Comparative Examples of the present application were measured by the following method.

Samples for refractive index measurement were prepared by forming a substrate layer, a resin layer, a dielectric layer, or an inorganic layer on a Si-substrate. The samples were analyzed using an ellipsometer (J.A. Woolam Co. M200U model) and the refractive index in a wavelength range of 633 nm was obtained.

The thicknesses of the layers coated on the substrate layer were measured using a scanning electron microscope (Hitachi S4800).

2. Measurement of Average Light Transmittance

Light transmittance spectra of the barrier films prepared in the Examples and the Comparative Examples were evaluated (arithmetical mean of light transmittance from 380 nm to 780 nm) using Shimadzu UV3600.

3. Measurement of Water Vapor Transmission Rate

Water vapor transmission rates of the barrier films prepared in the Examples and the Comparative Examples were measured using the Lyssy L80, under 100% relative humidity at 30° C.

4. Measurement of Yellowness Index and CIE Value

Yellowness indices (according to ASTM E313) and a* and b* values on CIE color system of the barrier films prepared in the Examples and the Comparative Examples were obtained from the respective light transmittance spectrum by using a utility provided by Shimadzu.

TABLE 1

| | Average Light Transmittance (%) | a* | b* | Yellowness Index | Water Vapor Transmission Rate (g/m² day) |
|---|---|---|---|---|---|
| Example 1 | 89.2 | 0.0 | 0.4 | 0.8 | <0.03 |
| Example 2 | 89.7 | −0.3 | 0.9 | 1.6 | <0.03 |
| Example 3 | 88.9 | 0.1 | 0.8 | 1.6 | <0.03 |
| Example 4 | 88.9 | 0.1 | 0.8 | 1.6 | <0.03 |
| Example 5 | 89.0 | −0.5 | 1.0 | 1.5 | <0.03 |
| Example 6 | 88.7 | −0.4 | 1.0 | 1.6 | <0.03 |

TABLE 1-continued

| | Average Light Transmittance (%) | a* | b* | Yellowness Index | Water Vapor Transmission Rate (g/m² day) |
|---|---|---|---|---|---|
| Example 7 | 88.8 | 0.6 | 0.9 | 2.3 | <0.03 |
| Example 8 | 88.9 | 0.8 | 0.9 | 2.4 | <0.03 |
| Example 9 | 88.3 | −0.4 | 1.3 | 2.3 | <0.03 |
| Comparative Example 1 | 88.8 | −0.4 | 2.0 | 3.5 | <0.03 |
| Comparative Example 2 | 88.7 | −0.1 | 1.8 | 3.3 | <0.03 |
| Comparative Example 3 | 86.9 | 1.9 | −3.5 | −5.4 | <0.03 |
| Comparative Example 4 | 88.7 | −0.9 | 1.9 | 3.0 | <0.03 |
| Comparative Example 5 | 88.7 | 0.8 | 1.1 | 2.8 | <0.03 |
| Comparative Example 6 | 88.7 | 0.4 | 1.4 | 3.0 | <0.03 |

The invention claimed is:

1. A barrier film comprising a substrate layer, an inorganic layer, and a resin layer sequentially, and comprising a first dielectric layer present between the substrate layer and the inorganic layer and a second dielectric layer present between the inorganic layer and the resin layer, and satisfying the following Expression 1 or Expression 2:

$$n_p \leq n_s \leq n_1 < n_i \quad \text{[Expression 1]}$$

$$n_p \leq n_s \leq n_2 < n_i \quad \text{[Expression 2]}$$

where in Expression 1 and Expression 2, $n_p$ is a refractive index of the resin layer, $n_s$ is a refractive index of the substrate layer, $n_1$ is a refractive index of the first dielectric layer, $n_2$ is a refractive index of the second dielectric layer, and $n_i$ is a refractive index of the inorganic layer, and wherein, when $n_1$ is equal to or bigger than $n_2$ ($n_1 \geq n_2$), $d_1$ is equal to or smaller than $d_2$ ($d_1 \leq d_2$), and when $n_2$ is equal to or bigger than $n_1$ ($n_2 \geq n_1$), $d_2$ is equal to or smaller than $d_1$ ($d_2 \leq d_1$), where $d_1$ is a thickness of the first dielectric layer and $d_2$ is a thickness of the second dielectric layer.

2. The barrier film of claim 1, which satisfies Expression 1 and Expression 2.

3. The barrier film of claim 1, wherein, when $n_1$ is bigger than $n_2$ ($n_1 \geq n_2$), the first dielectric layer has a thickness less than 450 nm, and when $n_2$ is bigger than $n_1$ ($n_2 \geq n_1$), the second dielectric layer has a thickness less than 450 nm.

4. The barrier film of claim 1, satisfying Expression 1 and Expression 2, wherein, when $n_1$ is equal to or bigger than $n_2$ ($n_1 \geq n_2$), the first dielectric layer has a thickness equal to or more than 100 nm and less than 450 nm, and when $n_2$ is equal to or bigger than $n_1$ ($n_2 \geq n_1$), the second dielectric layer has a thickness equal to or more than 100 nm and less than 450 nm.

5. The barrier film of claim 1, wherein the refractive index of the first dielectric layer $n_1$ or the refractive index of the second dielectric layer $n_2$ is in the range of 1.35 to 1.9.

6. The barrier film of claim 1, wherein the refractive index of the resin layer $n_p$ is in the range of 1.4 to 1.7.

7. The barrier film of claim 1, wherein the refractive index of the substrate layer $n_s$ is in the range of 1.45 to 1.78.

8. The barrier film of claim 1, wherein the refractive index of the inorganic layer $n_i$ is 1.65 or more.

9. The barrier film of claim 1, wherein the refractive index of the first dielectric layer $n_1$ and the refractive index of the inorganic layer $n_i$ satisfy the following Expression 3:

$$0.3 \leq (n_1-1)/(n_i-1) \leq 0.95. \quad \text{[Expression 3]}$$

10. The barrier film of claim 1, wherein the refractive index of the second dielectric layer $n_2$ and the refractive index of the inorganic layer $n_i$ satisfy the following Expression 6:

$$0.3 \leq (n_2-1)/(n_i-1) \leq 0.95. \quad \text{[Expression 6]}$$

11. The barrier film of claim 1, wherein the yellowness index according to ASTM E313 is in the range of −2.5 to 2.5.

12. The barrier film of claim 1, wherein the inorganic layer comprises one or more oxides or nitrides of a metal selected from the group consisting of Al, Zr, Ti, Hf, Ta, In, Sn, Zn, Ce, and Si.

13. The barrier film of claim 12, wherein the inorganic layer includes zinc-tin oxide.

14. The barrier film of claim 1, wherein the first dielectric layer or the second dielectric layer is an organic or organic-inorganic composite layer.

15. The barrier film of claim 14, wherein the first dielectric layer or the second dielectric layer comprises at least one selected from the group consisting of an acryl-based resin, a urethane-based resin, a melamine resin, an alkyd resin, an epoxy-based resin, a siloxane-based polymer, and an organic silane compound of Formula 1:

[Formula 1]

where in Formula 1, X is hydrogen, a halogen, an alkoxy group, an acyloxy group, an alkyl carbonyl group, an alkoxy carbonyl group, or —N(R$_2$)$_2$, where R$_2$ is hydrogen or an alkyl group, R$_1$ is an alkyl group, an alkenyl group, an alkynyl group, an aryl group, an arylalkyl group, an alkylaryl group, an arylalkenyl group, an alkenylaryl group, an arylalkynyl group, an alkynylaryl group, a halogen, an amino group, an amide group, an aldehyde group, an alkylcarbonyl group, a carboxy group, a mercapto group, a cyano group, a hydroxy group, an alkoxy group, an alkoxycarbonyl group, a sulfonyl group, a phosphoryl group, an acryloyloxy group, a methacryloxy group, or an epoxy group, and Q is a single bond, an oxygen atom, or —N(R$_2$)—, where R$_2$ is a hydrogen atom or an alkyl group, and m is a number in a range of 1 to 3.

16. The barrier film of claim 14, wherein the first dielectric layer or the second dielectric layer comprises at least one compound selected from the group consisting of metal alkoxide compounds of Formula 2:

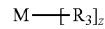

[Formula 2]

where in Formula 2, M is a metal selected from the group consisting of aluminum, zirconium, and titanium, and R$_3$ is a halogen, an alkyl group, an alkoxy group, an acyloxy group, or a hydroxyl group, and z is 3 or 4.

17. A method of preparing a barrier film of claim 1, comprising forming a first dielectric layer, an inorganic layer, a second dielectric layer and a resin layer on a substrate layer, and satisfying the following Expression 1 or Expression 2:

$$n_p \leq n_s \leq n_1 < n_i \quad \text{[Expression 1]}$$

$$n_p \leq n_s \leq n_2 < n_i \quad \text{[Expression 2]}$$

where in Expression 1 and Expression 2, $n_p$ is a refractive index of the resin layer, $n_s$ is a refractive index of the substrate layer, $n_1$ is a refractive index of the first dielectric layer, $n_2$ is a refractive index of the second dielectric layer, and $n_i$ is a refractive index of the inorganic layer, and wherein, when $n_1$ is equal to or bigger than $n_2$ ($n_1 \geq n_2$), $d_1$ is equal to or smaller than $d_2$ ($d_1 \leq d_2$), and when $n_2$ is equal to or bigger than $n_1$ ($n_2 \geq n_1$), $d_2$ is equal to or smaller than $d_1$ ($d_2 \leq d_1$), where $d_1$ is a thickness of the first dielectric layer and $d_2$ is a thickness of the second dielectric layer.

* * * * *